(12) United States Patent
Flood et al.

(10) Patent No.: US 7,180,028 B2
(45) Date of Patent: Feb. 20, 2007

(54) CONFIGURABLE DUAL PROCESS WELDING HEAD AND METHOD

(75) Inventors: Dale A. Flood, El Dorado Hills, CA (US); Michael R. Porter, El Dorado Hills, CA (US)

(73) Assignee: Tri Tool, Inc., Rancho Cordova, CA (US)

( * ) Notice: Subject to any disclaimer, the term of this patent is extended or adjusted under 35 U.S.C. 154(b) by 14 days.

(21) Appl. No.: 11/184,903

(22) Filed: Jul. 20, 2005

(65) Prior Publication Data

US 2007/0017912 A1  Jan. 25, 2007

(51) Int. Cl.
*B23K 9/167* (2006.01)
*B23K 9/173* (2006.01)

(52) U.S. Cl. .................. 219/125.1; 219/75; 219/137.2
(58) Field of Classification Search ............. 219/125.1, 219/125.11, 75, 137.2, 137.31, 137.9
See application file for complete search history.

(56) References Cited

U.S. PATENT DOCUMENTS

| | | | |
|---|---|---|---|
| 2,754,395 A * | 7/1956 | Scheller et al. .......... | 219/137.9 |
| 4,600,824 A | 7/1986 | Moerke | |
| 5,258,599 A | 11/1993 | Moerke | |

FOREIGN PATENT DOCUMENTS

JP    356009063 A    1/1981

OTHER PUBLICATIONS

*MIG* vs. *Flux-Cored:* Which Welding Process Is Right For You?, downloaded from Internet on Mar. 23, 2005, pp. 1-5.
Guidelines To Gas Tungsten Arc Welding (GTAW), handbook from Miller Electric, UG0215 994, Jul. 2003.
Model 15 Large-Diameter Pipe Weld Head, advertising borchure of Arc Machines, Inc., MKT 15 WH/Jun. 2000/E.
Model 415 Programmable Multi-Function Weld Power Supply, advertising brochure of Arc Machines, Inc., MKT 415 PS/Jun. 2000/E.
Pipeliner II Weld Head Models 607 & 609 For Multi-Pass Orbital GMAW/FCAW Pipe Welding, advertising brochure of Magnatech Limited Partnership.

(Continued)

*Primary Examiner*—Clifford C. Shaw
(74) *Attorney, Agent, or Firm*—Bacon & Thomas PLLC

(57) ABSTRACT

A welding head employs a carriage assembly for guiding the welding head along a track or guide. A torch assembly, mounted on the carriage assembly, is configurable for multiple welding processes. The torch assembly includes a torch block and a GTA filler wire guide mounted together on a mounting plate, whereby the GTA filler wire guide is placed in general proximity of a welding torch mounted on the torch block. The torch block accommodates the mounting of either of a GMA torch and a GTA torch. Additionally, the torch block accommodates placement of a GMA adapter sleeve within the torch block to feed a filler wire through the GMA torch. A system control unit provides manual, semi-automated, or automated control of welding system resources including a welding power supply, a supply of one or more shielding gasses, and a fluid coolant supply.

14 Claims, 8 Drawing Sheets

OTHER PUBLICATIONS

D-Head/T-Head Weld Head Models 417 and 420 For Multi-Pass Orbital GTAW Pipe Welding, advertising brochure of Magnatech Limited Partnership, Jul. 2002.
Pipeliner MPS-4000 Power Source for Multi-Pass Orbital GMAW/FCAW Pipe Welding, advertising brochure of Magnatech Limited Partnership, Apr. 2002.
Roughneck MIG Guns, advertising brochure.
WP-18, 18V, 18SP, advertising brochure of Weldcraft Products, Inc., Sep. 1995.
Gas Metal Arc Welding, downloaded from the Internet on Mar. 24, 2005, pp. 1-4.
The Plasma Arc Welding Process, downloaded from the Internet on Mar. 24, 2005, pp. 1-6.
Daytona MIG, downloaded from the Internet on Mar. 21, 2005, pp. 1-4.
Invision 456P, advertising borchure of Miller Electric Mfg. Co., Index No. DC/20, Jan. 2005.
PC Power Sources, advertising brochure of Astro Arc Polysoude.
Cold Wire Tig Feeders, downloaded from the Internet on Apr. 12, 2005, pp. 1-4.

* cited by examiner

CONFIGURABLE DUAL PROCESS WELDING HEAD AND METHOD

FIELD OF THE INVENTION

The present invention generally relates to the field of arc welding, and more particularly to a configurable dual process welding head adaptable for both GMA and GTA welding processes, and to a method for configuring the dual process weld head to perform either a GMA or a GTA welding process.

BACKGROUND

Gas metal arc (GMA) welding and gas tungsten arc (GTA) welding processes are well known in the art. In both processes, heat from an electrical arc melts a consumable filler wire to form a weld. In the GMA process, a filler wire is fed through a welding gun or torch assembly, and the filler wire itself is electrified to form an arc between an end of the filler wire and a work piece. As the end of the filler wire melts away, the filler wire is advanced to maintain the filler wire end proximate to the work piece. In a specialization of the GMA process known as flux cored arc (FCA) welding, the filler wire has a flux core, the flux containing various alloying and cleaning agents.

In the GTA process, an arc is created between a non-consumable tungsten electrode, held by the welding gun or torch assembly, and the work piece. Heat from the arc melts the work piece, forming a weld pool. A filler wire may be applied to the weld pool to add material to the weld.

In both the GMA and GTA processes, a shielding gas is typically used. Various shielding gasses are used for either process, although different gasses or gas mixtures are generally chosen for each process, and specialized gas mixtures may be employed for certain types of welds or for welding certain metals.

Certain advantages and disadvantages are found with each of the processes. The GTA process typically results in a preferential bead contour and appearance, and in fewer imperfections. The GTA process, however, is generally more time consuming because of a lower rate of filler metal deposition. The GMA process provides a greater deposition rate, and provides a generally acceptable bead profile for fill and cap passes. The FCA process provides the greatest deposition rate, an acceptable bead profile for fill and cover passes, and heat affected zone metallurgical qualities similar to the GMA process. The FCA process, however, requires slag removal between passes and produces the greatest amount of fumes.

Given the differences between the processes, a single welding task may employ more than a single process. For example, in certain welding procedures employed in joining pipes, the GTA welding process may be initially used for one or more passes, and a weld joint finished using one or more GMA passes to fill and cover the weld joint.

Various semi-automated, automated or robotic welding apparatus are known for performing complex, time consuming, or precision welds. One type of welding apparatus is specialized for welding pipes: orbital welding.

Orbital welding apparatus employ a welding head that travels about the circumference of a pipe, often riding along a track placed about the pipe. Known orbital welding apparatus employ either a GTA welding head or a GMA welding head. Thus, for welding tasks wherein both GTA and GMA processes are to be employed, it is necessary to acquire both GTA and GMA welding equipment systems.

To perform initial GTA welding passes followed by GMA welding passes requires, at a minimum, that the welding head be replaced for each process. Further, shielding gas supplies and power supplies must be exchanged to meet the different needs of the GTA and GMA processes. Moreover, issues of compatibility between the weld head and the track may require that a track installed for the GTA process must be removed altogether, and a track compatible with the GMA weld head must be replaced in alignment with the pipe joint. Weld track placement, in an acceptable manner, can be a time consuming and tedious task. It can be recognized that the need to acquire and maintain separate GTA and GMA welding equipment, along with the need to change equipment during the course of a welding task, results in increased cost of completing a welding task that requires both GTA and GMA welding processes.

For the foregoing reasons, there is a need for a welding apparatus that is adaptable to perform both GTA and GMA welding processes.

SUMMARY

A welding system disclosed herein includes a welding head adaptable for both gas metal arc (GMA) and gas tungsten arc (GTA) welding processes. The welding head employs a carriage assembly for guiding the welding head along a track or guide. A torch assembly, mounted on the carriage, is configurable for performing both GMA and GTA welding processes (as well as the flux core arc (FCA) process which is functionally generally similar to the GMA process). The torch assembly includes a torch block and a GTA filler wire guide mounted together on a mounting plate such that the torch block and the GTA filler wire guide may be altered in position relative to one another. The torch block accommodates mounting of either of a GMA torch or a GTA torch. Additionally, the torch block accommodates placement of a GMA adapter sleeve within the torch block to feed filler wire through the GMA torch during the GMA welding process.

The torch assembly is configured for the GMA welding process by installing a GMA torch assembly in the torch block, installing the GMA adapter sleeve in the torch block, and connecting a filler wire supply conduit to the GMA adapter sleeve. The torch assembly is reconfigured for the GTA welding process by replacing the GMA torch assembly with a GTA torch assembly, and by removing the GMA adapter sleeve and inserting a cap in its place. The filler wire supply conduit is connected to the GTA filler wire guide for the GTA welding process.

A system control unit provides manual, semi-automated, or automated control of welding system resources. These welding system resources include a welding power supply, a supply of one or more shielding gasses, and a fluid coolant supply. The system control unit also controls the operation of the carriage assembly, including movement of the carriage along a track, operation of a filler wire feeder, welding arc voltage, and oscillation of the welding torch along a weld seam.

BRIEF DESCRIPTION OF THE DRAWINGS

Similar reference characters denote corresponding features consistently throughout the attached drawings.

DETAILED DESCRIPTION OF VARIOUS EMBODIMENTS

Figure 1:
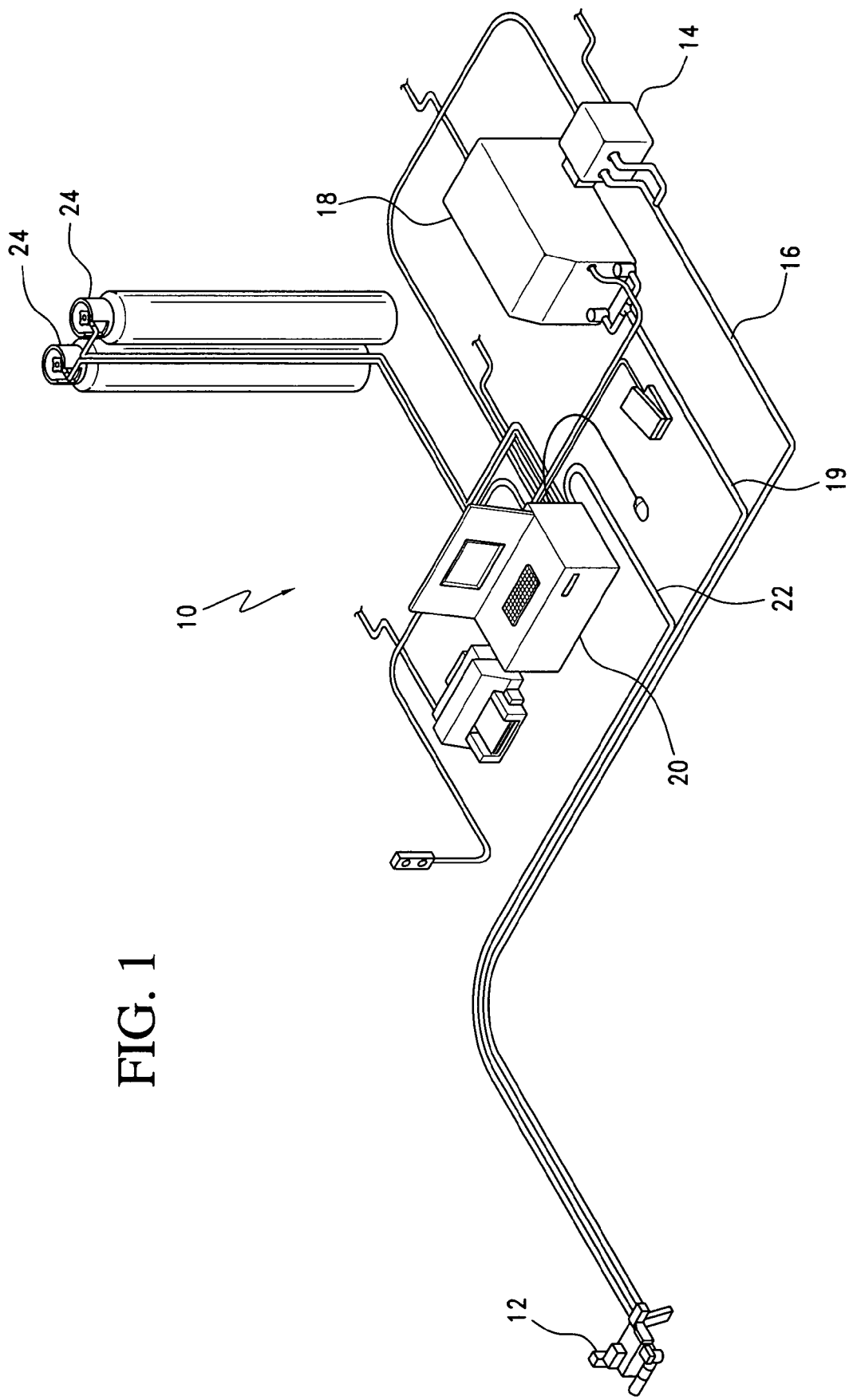
FIG. 1 is a schematic view of a welding system incorporating a welding head adaptable for both gas metal arc (GMA) and gas tungsten arc (GTA) welding processes.

The present invention encompasses a welding head adaptable for both gas metal arc (GMA) and gas tungsten arc (GTA) welding processes, and a method for adapting the welding head to perform either a GMA or a GTA welding process. Referring to FIG. 1, a welding system 10 is illustrated including a welding head 12. The welding head 12 is connected by various cables and conduits to system components for the supply of cooling fluid, a welding power supply, shielding gasses, and power and control signals to manipulate the welding head 12. In the configuration illustrated, the welding system 10 includes a fluid cooler 14, connected to the welding head 12 by a circulating fluid conduit 16, a welding power supply 18 connected to the welding head 12 by a welding power cable 19, and a system control unit 20, connected to the welding head 12 by a cable bundle 22 that includes a shielding gas conduit and electrical wires to provide power and control signals to the welding head 12.

The welding system 10 provides the welding head 12 with the resources necessary for both GMA and GTA welding processes. The system control unit 20 provides full or semi automated performance of the welding processes. The system control unit 20, either under the manual control of an operator or under the control of a computer program operating within the system control unit 20, provides a shielding gas mixture by selecting from or mixing a plurality of shielding gas sources 24. Similarly, the system control unit 20 controls the welding power supply 18 to set current, voltage, pulse, and other parameters, as well as to start, stop, sense, and adjust the weld power supply. The system control unit 20 also controls the fluid cooler 14 to start, stop, sense, and adjust the flow of a cooling fluid.

Figure 2:
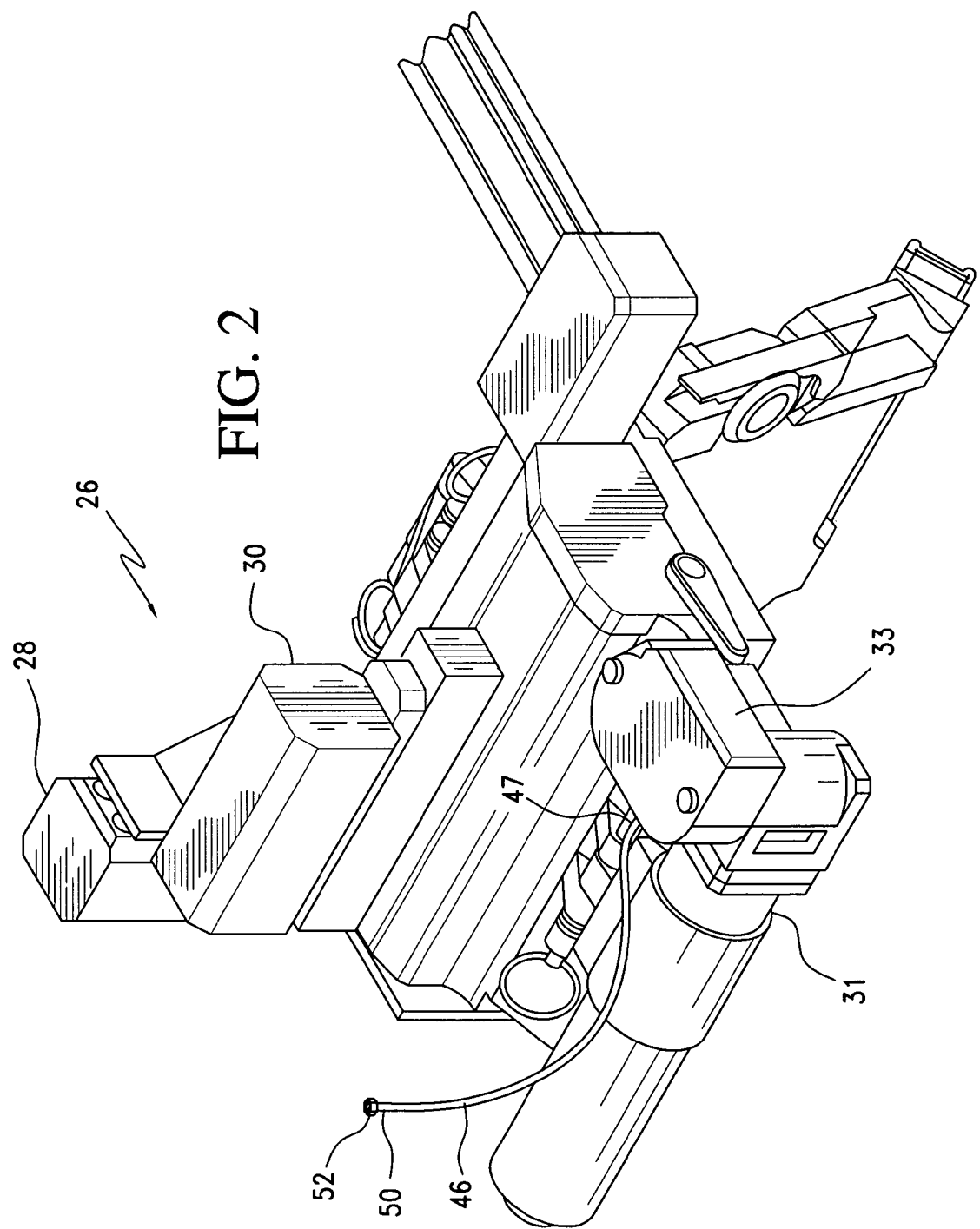
FIG. 2 is a perspective view of an embodiment of a carriage apparatus in a welding head according to the present invention.

The welding head 12 comprises a welding torch assembly 32 (not shown in FIG. 1, but seen in FIG. 3) disposed on a carriage assembly. Referring to FIG. 2, an exemplary carriage assembly 26 is shown. The carriage assembly 26 carries the welding torch assembly (not shown), and is adapted to travel along a guide or track (not shown). Although the carriage assembly 26 illustrated is adapted for use with a circular, or orbital, track, a carriage assembly may be alternatively configured for use with other track configurations.

The carriage assembly 26 includes motorized actuators to manipulate the position of an attached welding torch assembly (not shown in FIG. 2). A first motorized actuator 28 provides movement of the welding torch assembly toward and away from a work piece, varying the arc gap between a welding torch electrode and the work piece. The first motorized actuator 28 is also referred to as the arc voltage control (AVC) actuator because varying the arc gap varies the arc voltage. A second motorized actuator 30 provides cross-seam movement of the welding torch assembly, moving the welding torch back and forth across the weld seam. The second motorized actuator 30 is also referred to as the oscillation actuator.

A wire feed motor 31 located on the carriage assembly 26 drives a wire feed device 33 that feeds a filler wire from a filler wire supply through a filler wire supply conduit 46 to the torch assembly 32. A first end 47 of the filler wire supply conduit 46 receives a filler wire from the wire feed device 33. A second end 50 of the filler wire supply conduit 46 is fitted with a coupling fitting 52 such as an internally threaded cap nut or another fitting adapted to engage with a mating fitting. A travel motor (not shown) propels the carriage assembly along the track.

Figure 3:
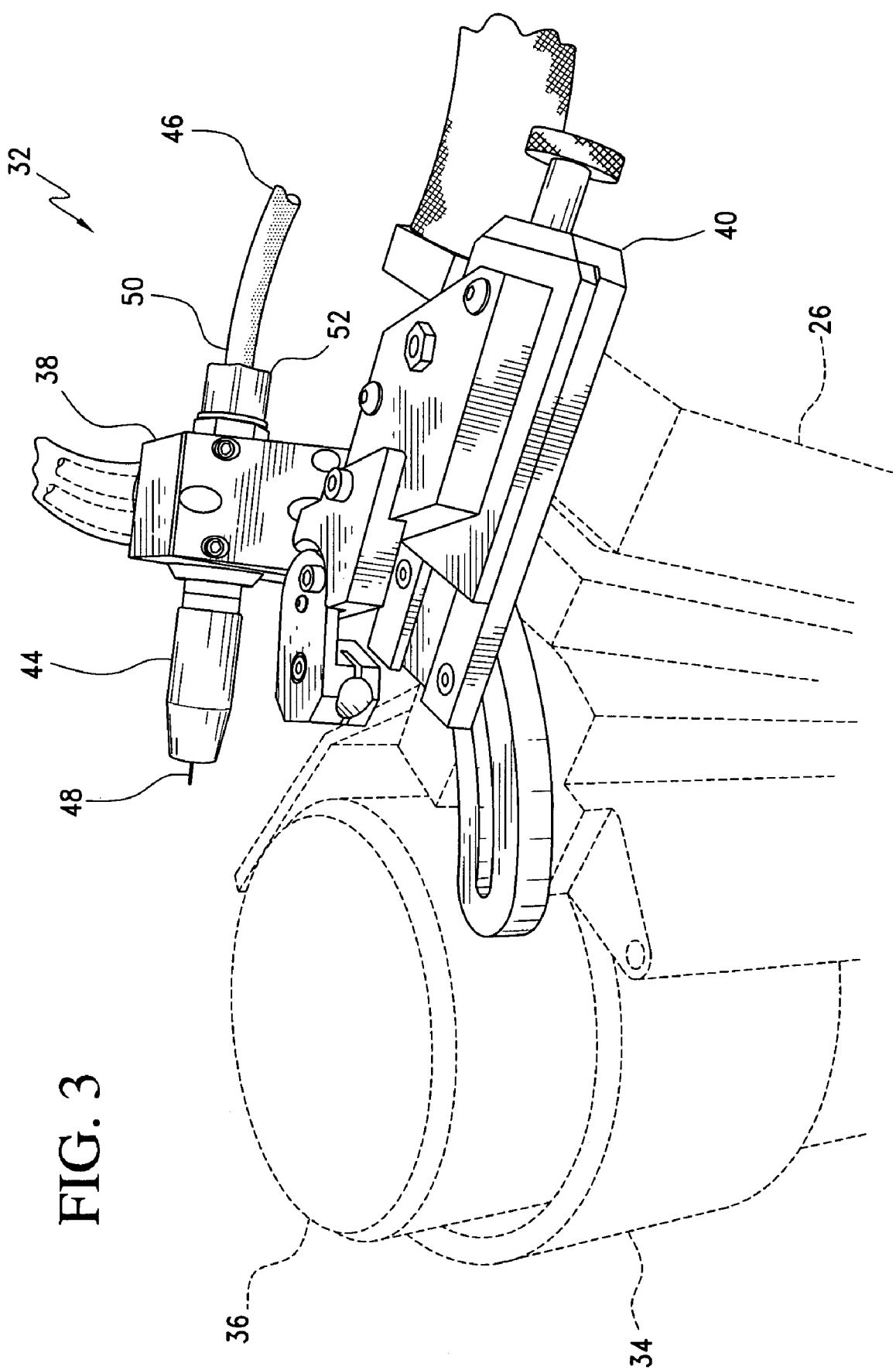
FIG. 3 is a perspective view of an embodiment of a welding torch assembly configured for a GMA welding process.

Turning now to FIG. 3, a welding torch assembly 32 is shown mounted on the carriage assembly 26, wherein the welding torch assembly 32 is configured for the GMA welding process. The carriage assembly 26 is shown positioned on a track 34 encircling a work piece 36. The welding torch assembly 32 includes a torch block 38 and a GTA filler wire adjustment module 40, mounted together on a mounting plate 42 (seen in FIG. 4). GMA torch 44 is mounted on the torch block 38 and a filler wire supply conduit 46 is connected to the torch block 38.

In this GMA process configuration, the coupling fitting 52 attaches the second end 50 of the filler wire supply conduit 46 to the torch block 38 for delivery of a filler wire 48 through the GMA torch 44. The filler wire 48, supplied to the torch block 38 through the filler wire supply conduit 46, is seen extending from the GMA torch 44.

Figure 4:
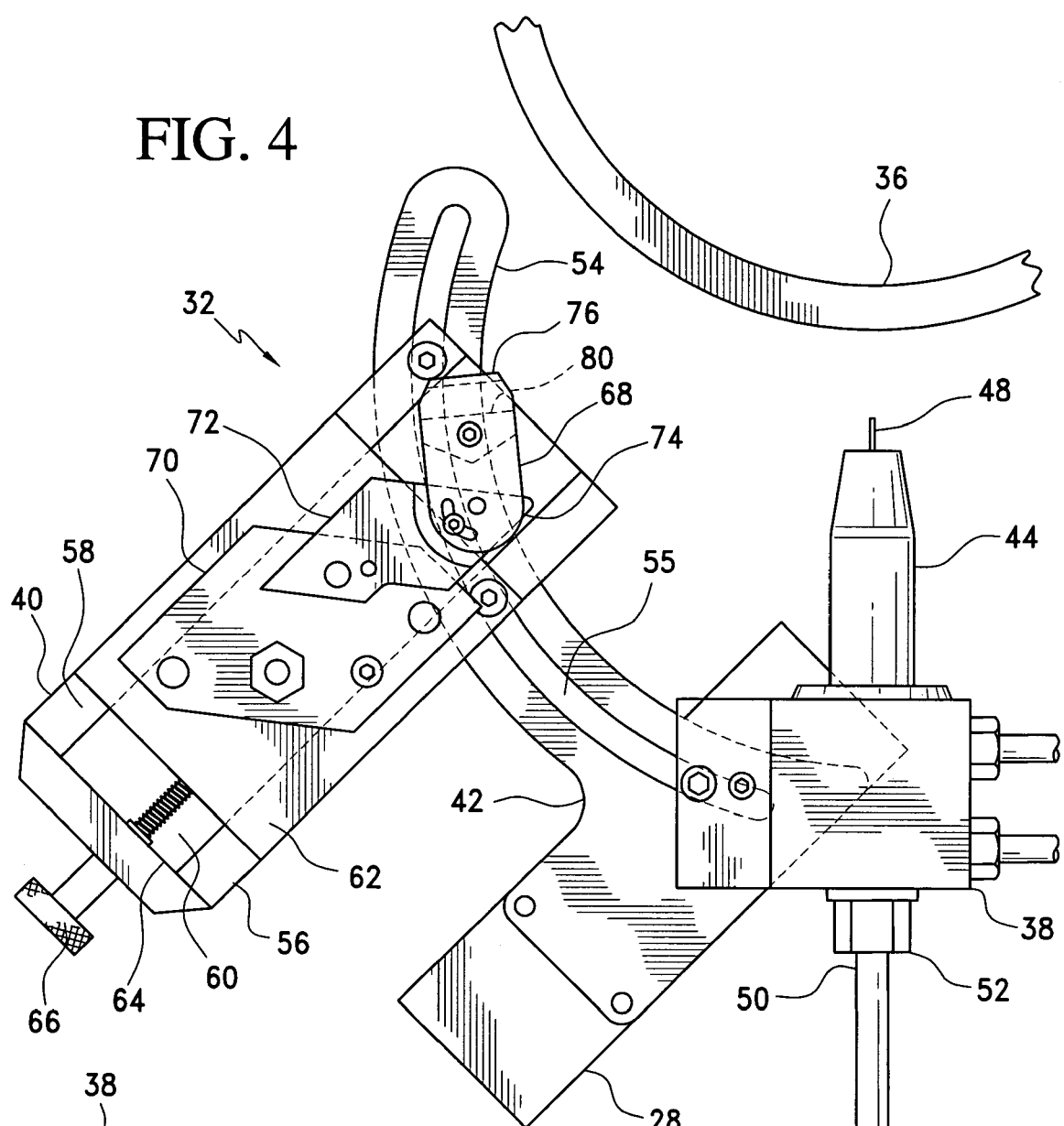
FIG. 4 is a plan view of the welding torch assembly of FIG. 3.
Figure 5:
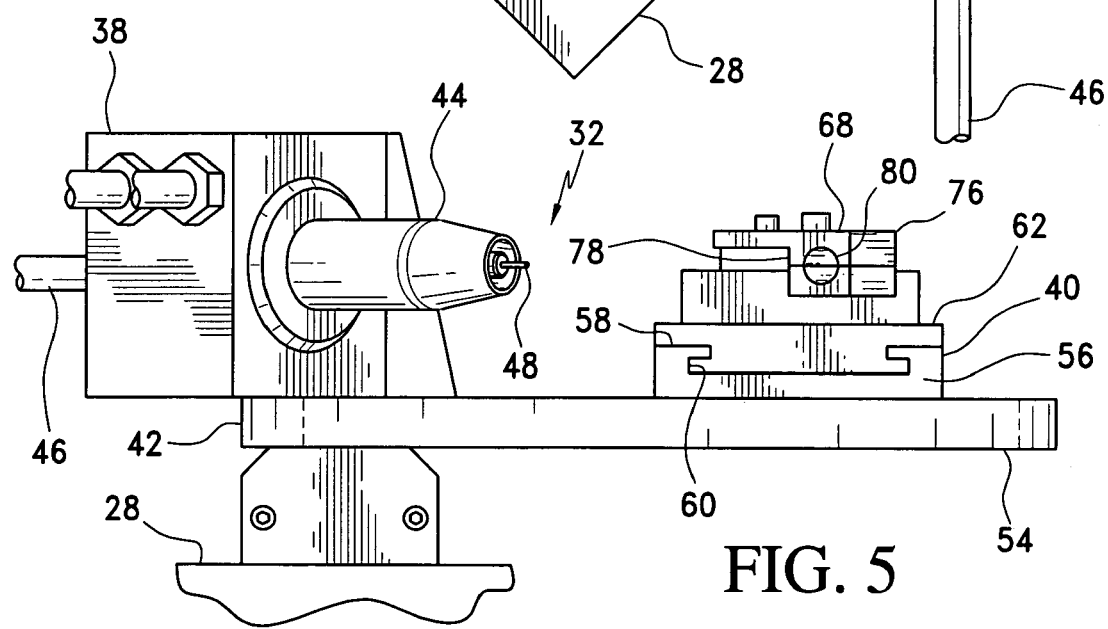
FIG. 5 is an elevational view of the welding torch assembly of FIG. 3.

Referring to FIGS. 4 and 5, a welding torch assembly 32 is described in greater detail. The torch block 38 and GTA filler wire adjustment module 40 are mounted generally proximately to one another on the mounting plate 42. The mounting plate 42 includes a slotted arcuate portion 54 that defines an elongated and arcuate slot 55. The torch block 38 and the GTA filler wire adjustment module 40 are slidably mounted such that the mounting position of the torch block 38 and GTA filler wire adjustment module 40 are variable. According to this embodiment, the mounting plate 42 is shown mounted on the AVC actuator 28.

The GTA filler wire adjustment module 40 comprises a base plate 56 having a top surface 58 wherein an elongated slide track 60 is defined. The base plate 56 mounts to the mounting plate 42. A sliding plate 62 is slidably engaged with the slide track 60 of the base plate 56, whereby the sliding plate 62 may be variably positioned along the base plate 56. The slide track 60 is terminated at one end of the base plate 56 by a back wall 64 of the base plate 56. An adjustment screw 66 extends through the back wall 64, and is coupled to the sliding plate 62 such that the position of the sliding plate 62 along the slide track 60 may be adjusted by turning the adjustment screw 66.

A filler wire guide holder 68 is coupled to the sliding plate 62. In the illustrated embodiment, the filler wire guide holder 68 is coupled to the sliding plate 62 by a pair of spacers. A first spacer 70 is attached to the top surface 58 of the sliding plate 62, and a second spacer 72 is mounted to the first spacer 70. The filler wire guide holder 68 has a first end 74 pivotally attached to the second spacer 72, and a second end 76 wherein a clamp portion 78 is formed. The clamp portion 78 of the filler wire guide holder 68 defines a slotted aperture 80 wherein a filler wire guide 82 (shown in FIGS. 6–8) may be retained.

The GTA filler wire adjustment module 40 allows for reconfiguration of the welding torch assembly 32, from the GMA process configuration shown in FIGS. 3–5, to a GTA process configuration.

Figure 6:
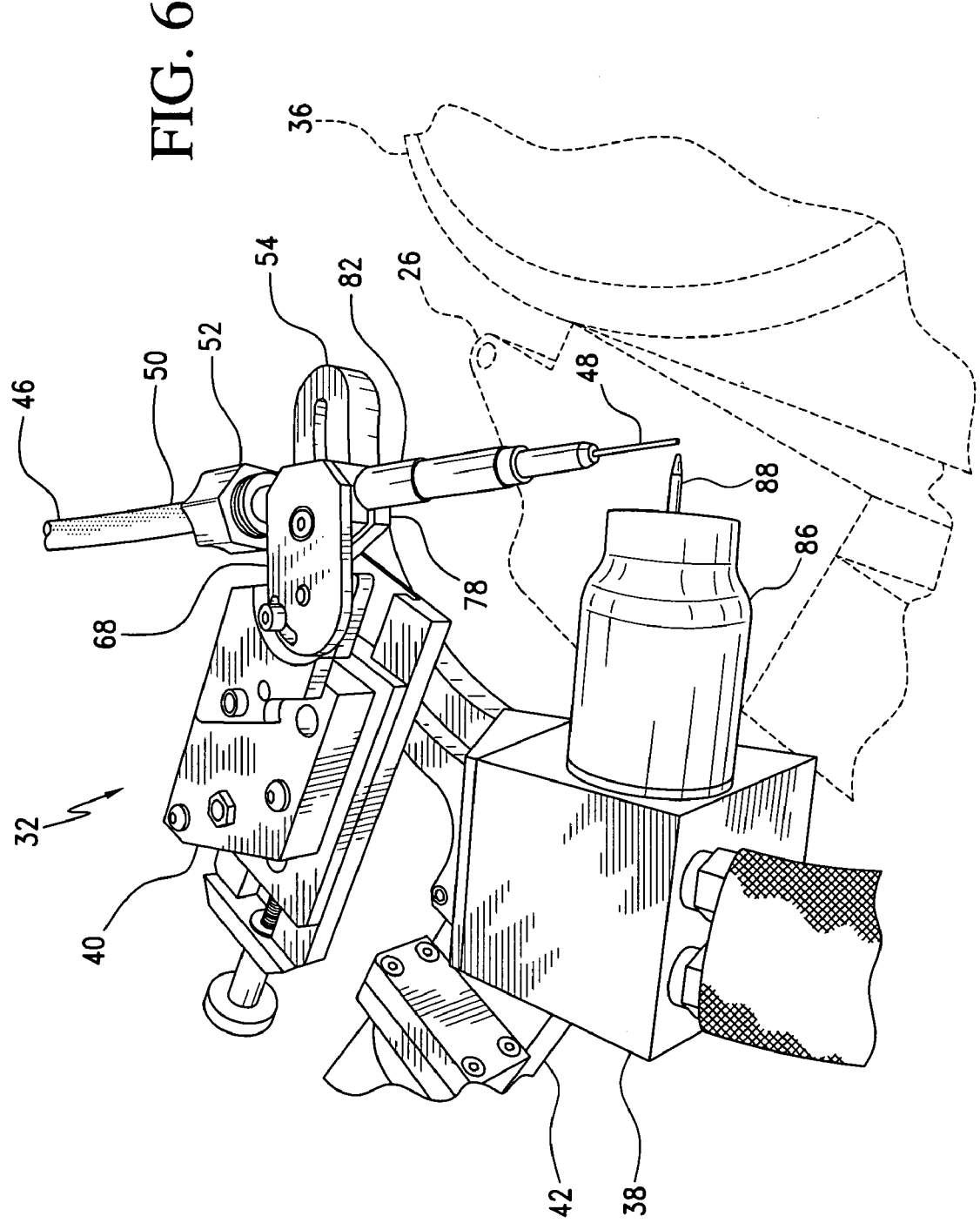
FIG. 6 is a perspective view of an embodiment of a welding torch assembly configured for a GTA welding process.
Figure 7:
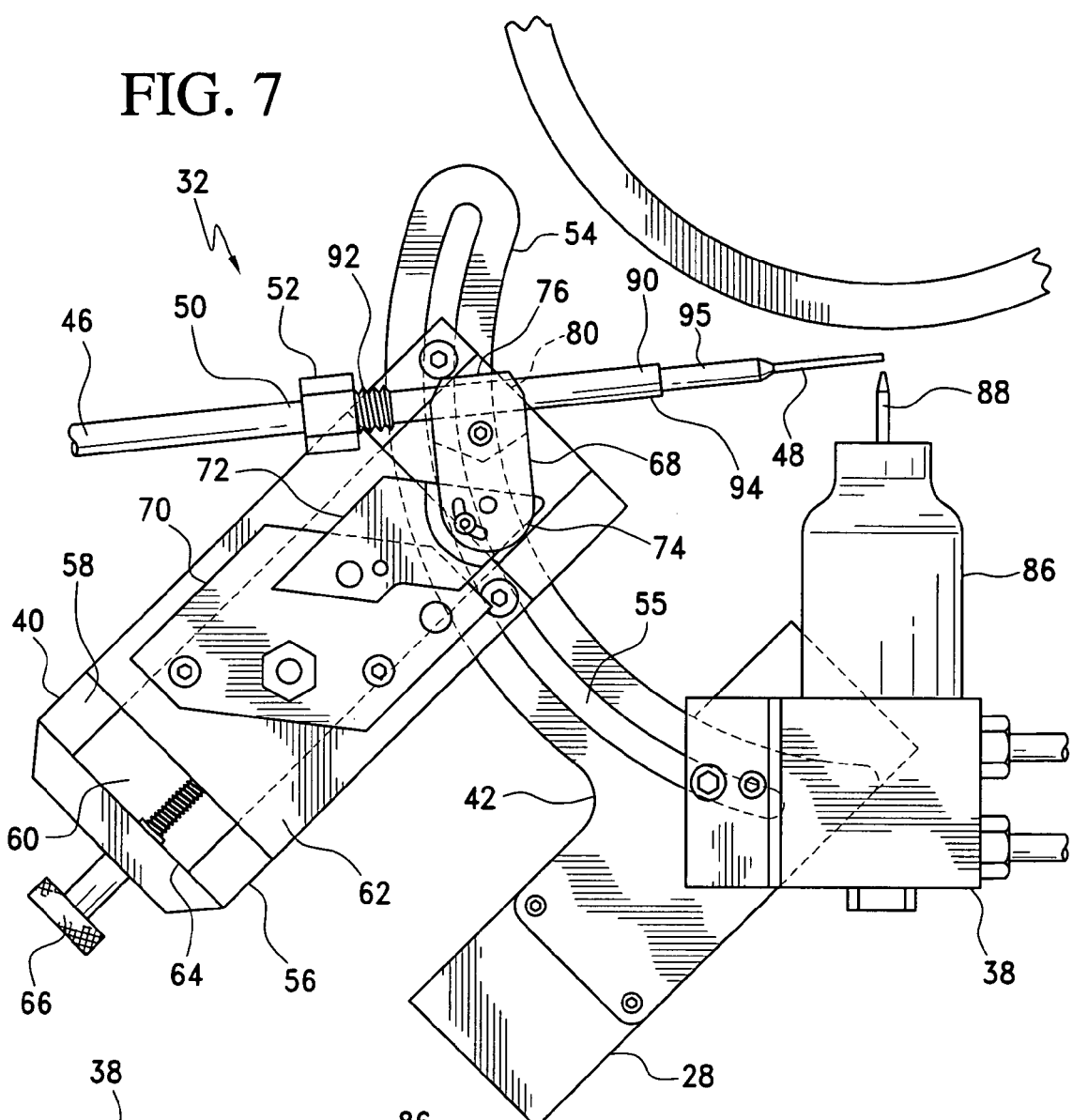
FIG. 7 is a plan view of the welding torch assembly of FIG. 6.
Figure 8:
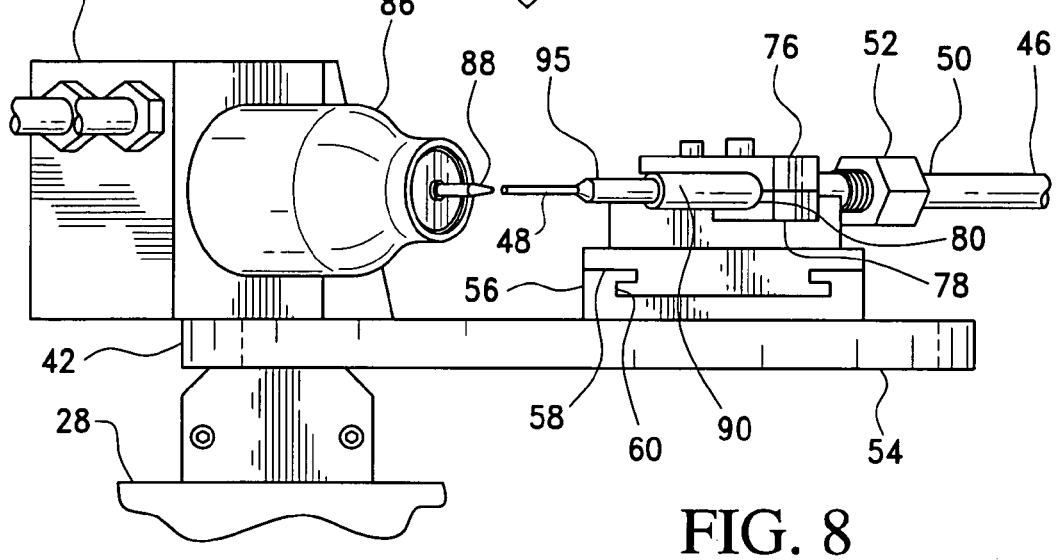
FIG. 8 is an elevational view of the welding torch assembly of FIG. 6.

Referring now to FIGS. 6–8, the welding torch assembly 32 is shown configured for the GTA welding process. In the GTA process configuration, a filler wire guide 82 is inserted in the clamp portion 78 of the filler wire guide holder 68. The filler wire supply conduit 46 is removed from the torch block 38 and is instead connected to the filler wire guide 82. Note that, for multi-process welding tasks, the filler wire guide 82 may remain in place in the filler wire guide holder 68 while the welding torch assembly 32 is configured for the GMA process, and thus positioned out of the way of the GMA torch.

The GMA torch 44 (seen in FIGS. 3–5) is replaced, in the GTA configuration, with a GTA torch 86 having a tungsten electrode 88. During GTA process operations, the filler wire guide 82 is positioned such that a filler wire 48 passed through the filler wire guide 82 is brought into proximity of a weld pool formed in a work piece 36 by an arc defined between the tungsten electrode 88 and the work piece 36.

The filler wire guide 82 comprises a generally tubular main body 90 having a first end 92 and a second end 94. The first end 92 is externally threaded or otherwise adapted for engagement with the coupling fitting 52 on the filler wire supply conduit 46. A wire nozzle 95 extends from the second end 94 of the main body 90. A length-wise passageway is defined through the wire nozzle 95 and through the main body 90 for the passage of a filler wire 48. During GTA process operations, the filler wire 48 is received from a filler wire source by way of the filler wire supply conduit 46 and passed through the filler wire guide 82, exiting the wire nozzle 95.

Figure 10:
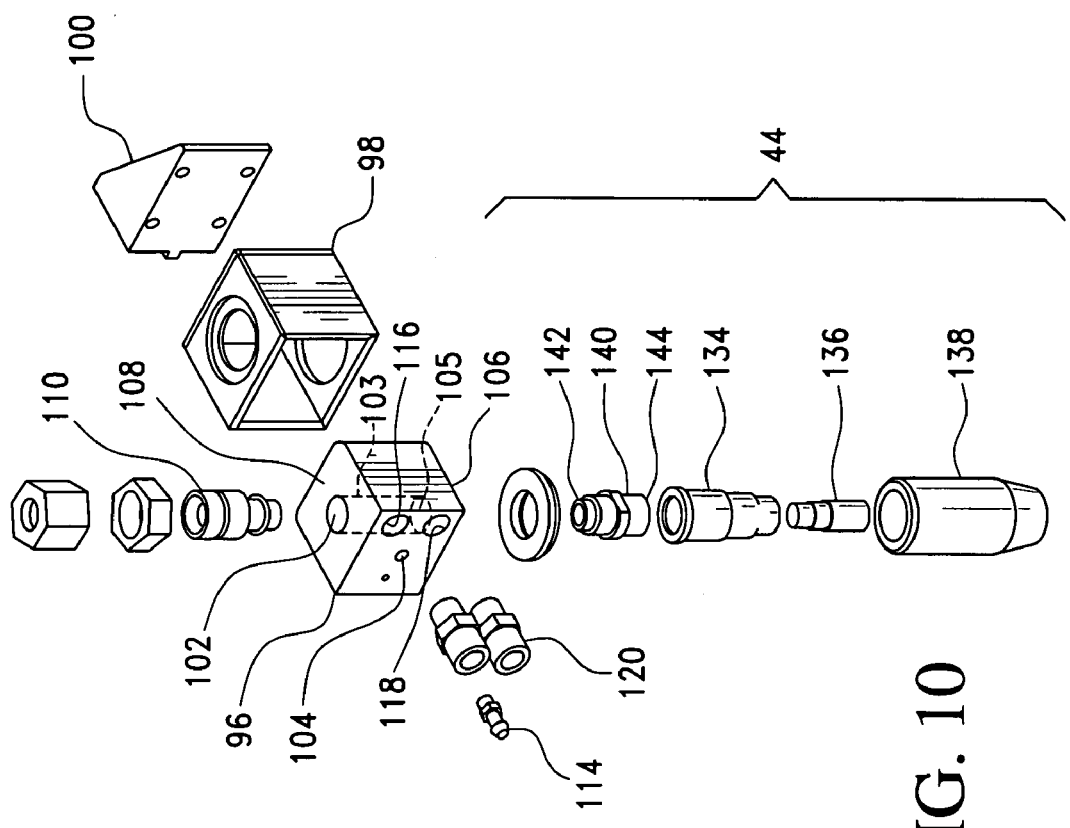
FIG. 10 is an exploded view of the torch block of FIG. 9, now configured for a GMA welding process.
Figure 9:
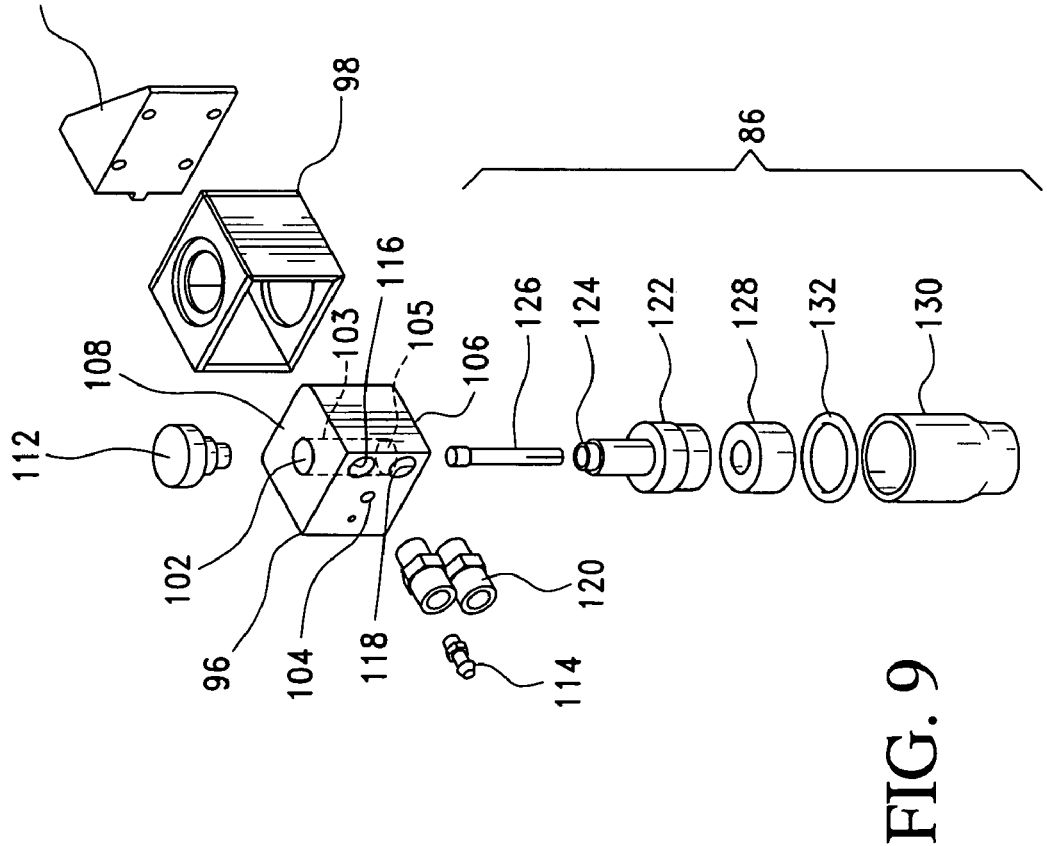
FIG. 9 is an exploded view of an embodiment of a welding torch block, configured for a GTA welding process.

Turning now to FIGS. 9 and 10, the torch block 38 is shown in greater detail. In FIG. 9, the torch block 38 is shown configured with GTA torch components for the GTA process, while FIG. 10 shows the torch block 38 configured with GMA torch components for the GMA process.

The torch block 38 comprises a torch body 96 retained within a phenolic housing 98. A phenolic mounting bracket 100 is attached to a side wall of the phenolic housing 98 for mounting the torch block 38 to the mounting plate 42. The torch body 96 is generally a cubic block of copper or another suitable material. Several apertures or passageways are defined within the torch body 96. A first passageway 102 extends through the torch block from a rear face 108 to a front face 106. A second passageway 104 extends into the torch body 96 to join the first passageway 102. The first passageway 102 has a first end 105 internally threaded adjacent to the front face 106 of the torch body 96 to receive a torch component. Additionally, the first passageway 102 has a second end 103 internally threaded adjacent to the rear face 108 of the torch body 96 to receive either a GMA adapter sleeve 110, used in a GMA process configuration, or a cap 112, used in a GTA process configuration. The GMA adapter sleeve 110 has a through hole for the passage of a GMA filler wire. Additionally, the GMA adapter sleeve is threaded, or otherwise adapted, for attachment of the filler wire supply conduit 46.

The second passageway 104 allows introduction of a shielding gas into the torch body 96, wherein the shielding gas passes into the first passageway 102 and through a torch attached to the torch body 96. A gas fitting 114 is attached to the torch body in communication with the second passageway 104 and permits attachment of a shielding gas supply line.

Additional passageways are defined within the torch body 96 and form a cooling fluid channel having an inlet 116 and an outlet 118 for circulation of a fluid coolant through the torch body 96. Fluid fittings 120 attached to the torch body 96 in communication with the inlet 116 and outlet 118 permit attachment of coolant supply and return lines in communication with the cooling fluid channel.

A torch assembly may be attached to the torch block 38 for the GTA process or for the GMA process. Referring to FIG. 9, a GTA torch 86 is comprised of a gas lens 122, having an externally threaded end 124 that may be engaged in the first passageway 102 at the front face 106 of the torch body 96. A collet 126 is retained within the gas lens 122 to receive and hold a tungsten electrode within the GTA torch 86. A gas lens adaptor 128 is located adjacent to the gas lens 122, and a nozzle cup 130 fits over the assembled GTA torch components. An O-ring 132 provides a seal between the nozzle cup 130 and the torch block 38.

Certain components of the GTA torch 86 are standard, commercially available torch components. Exemplary commercially available GTA torch components include a gas lens (part number 45V25), collet (part number 10N23), and nozzle cup (part number 57N75) manufactured by Weldcraft Products, Inc. of Burbank, Calif.

Referring now to FIG. 10, a GMA torch 44 is comprised of a gas diffuser 134, a contact tip 136 retained within the gas diffuser 134, and a nozzle cup 138 that fits over the assembled GMA torch components. Note that, while the internal threading of the first passageway 102 adjacent to the front face 106 of the torch body 96 is compatible with the externally threaded, commercially available, GTA torch components, commercially available GMA torch components are adapted for attachment to an externally threaded fitting. Thus, an adapter 140 is utilized for attachment of the GMA torch 44 to the torch body 96. The adapter has a first end 142 externally threaded and sized to engage with the internal threading of the first passageway 102 adjacent to the front face 106 of the torch body 96. A second end 144 of the adapter 140 is externally threaded and sized for the mounting of the gas diffuser 134.

Certain components of the GMA torch 44 are standard, commercially available parts. Exemplary commercially available GMA torch components include a gas diffuser (part number 198 957), contact tip (part number 205 177), and nozzle cup (part number 199 610) manufactured by Miller Electric Mfg Company of Appleton, Wis. and sold under the Roughneck brand name (Roughneck is a registered trademark of the Miller Electric Mfg Company).

Configuring the torch block 38 for the GMA process, a GMA torch 44 is installed in the torch block by assembling the GMA torch components on the torch body 96 as described above. Additionally, the GMA adapter sleeve 110 is installed in the first passageway 102 at the rear face 108 of the torch body 96, allowing a filler wire 48 to be passed through the torch body 96 and through the attached GMA torch 44. The filler wire supply conduit 46 is attached to the GMA adapter sleeve 110 by engaging the coupling fitting 52 onto the GMA adapter sleeve 110.

Configuring the torch block 38 for the GTA process, a GTA torch 86 is installed in the torch body 96 by assembling the GTA torch components on the torch body 96 as described above. Additionally, the filler wire supply conduit 46 is removed from the GMA adapter sleeve 110, and the GMA adapter sleeve 110 is removed from the first passageway 102 at the rear face 108 of the torch body 96, the cap 112 being installed in its place.

The welding head 12 is thus shown to be configurable for GTA and GMA welding processes by installing interchangeable GTA or GMA torch components on the torch block 38 and configuring the filler wire supply conduit 46 to feed filler wire 48 to either the GMA adapter sleeve 110 or the GTA filler wire guide 82. In addition to configuring the welding head 12 for a particular welding process, the welding system 10 must be configured for the welding process by selecting a correct shielding gas or gas mixture, and by setting welding power supply parameters. As discussed above in reference to FIG. 1, a system control unit 20 is largely in control of these configurations, although polarity of the welding power supply is manually changed by exchanging power supply lines in connection with positive and negative (or ground) terminals on the welding power supply 18.

Figure 11:
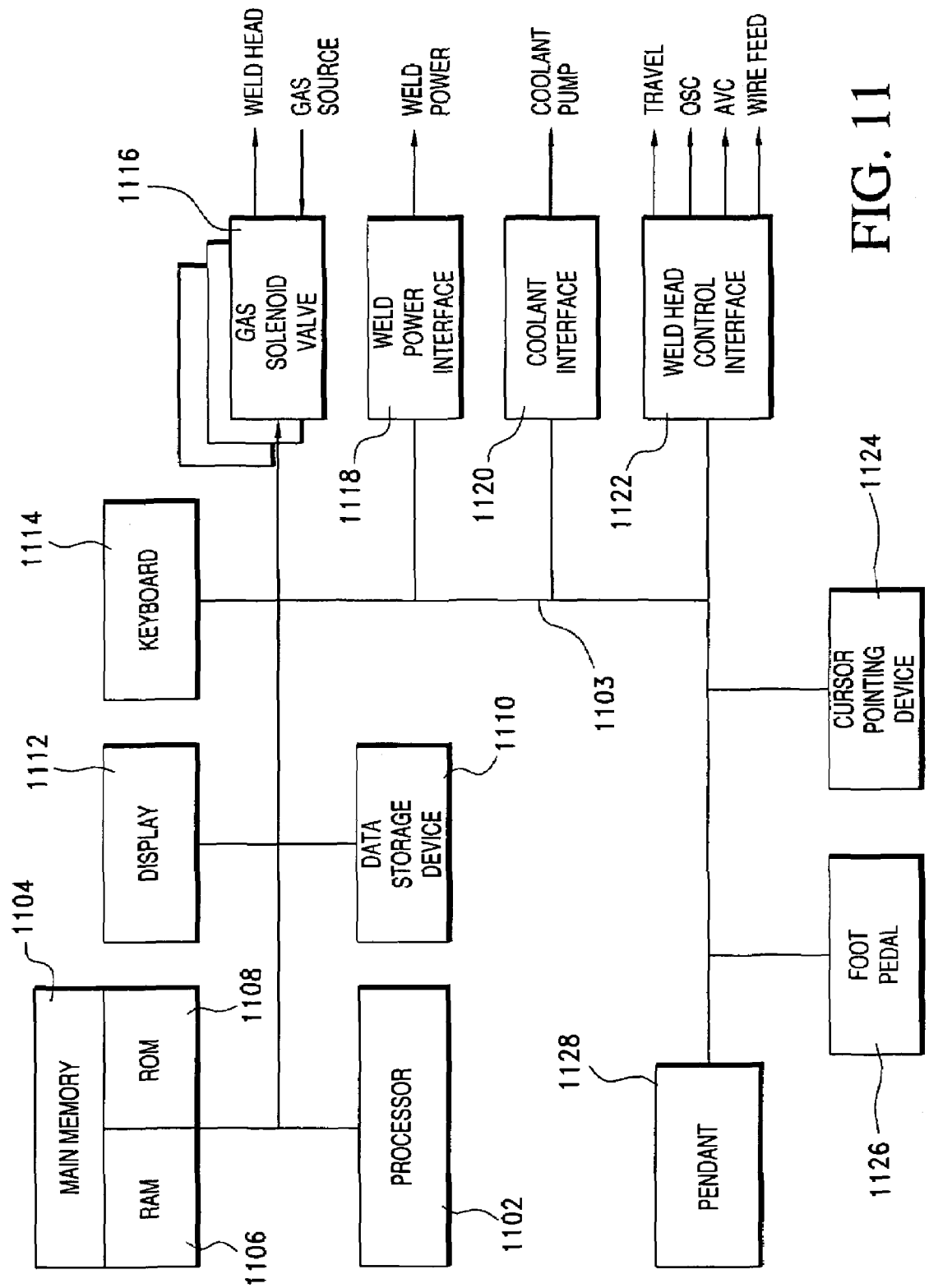
FIG. 11 is a block diagram of a system control unit in a welding system incorporating a welding head adaptable for both GMA and GTA welding processes.

Turning now to FIGS. 1 and 11, the system control unit 20 is described in greater detail. The system control unit 20 is a computerized controller including user interface components and interfaces for generating control signals to components of the welding system 10. The system control unit 20, illustrated in a block diagram in FIG. 11, includes a general purpose computer of a typical architecture generally having a computer processor 1102, connected by a bus 1103 to an area of main memory 1104 that comprises both random access memory (RAM) 1106 and read only memory (ROM) 1108. A data storage device 1110, such as a disk drive or a removable media reader, may be provided in communication with the computer processor 1102 for storage of one or more computer programs which may be loaded into RAM 1106 and executed by the microprocessor 1102. Alternatively, one or more computer programs may be stored entirely in the ROM 1108.

The system control unit 20 includes a display device 1112 and a keyboard 1114 in communication with the computer processor 1102 to provide a user interface. Additional interfaces are provided for the control and operation of the welding system 10. A shielding gas interface includes a plurality of gas solenoid valves 1116 each having an input in communication with a gas source. Gas outputs from each of the gas solenoid valves are mixed to a single shielding gas supply for the welding head 12. The system control unit 20, by selectively operating the gas solenoid valves 1116, may provide to the welding head 12 a single shielding gas from plural sources, or a mixture of plural shielding gasses for a particular welding process or task.

The system control unit 20 includes a weld power interface 1118 in communication with the computer processor 1102. The weld power interface 1118 receives data, such as voltage, current, operational status, and other data, from the welding power supply 18, and provides control signals to operate the welding power supply 18 under the control of the computer processor 1102.

The system control unit 20 includes a coolant interface 1120 in communication with the computer processor 1102. The coolant interface 1120 receives data, such as coolant temperature, coolant flow rate, operational status, and other data from the fluid cooler 14, and provides control signals to the fluid cooler 14 to operate the fluid cooler 14 under the control of the computer processor 1102.

Additionally, the system control unit 20 includes a weld head control interface 1122 in communication with the computer processor 1102. The weld head control interface 1122 provides control signals to operate the travel motor, the oscillation actuator 30, the AVC actuator 28, and the wire feed motor 31 on the carriage assembly 26. The weld head control interface 1122 may also receive various data from the welding head 12.

The system control unit 20 may include additional user interface device, such as a pointing device 1124 for manipulating a display cursor or the like. Additionally, a remote pendant 1128 may be used to provide full or partial control of the system control unit 20 at a location remote from the display 1112 and keyboard 1114.

An operational computer program or operating system is stored in the system control unit in the ROM 1108 or on the storage device 1110 for execution by the computer processor. The operational computer program provides user interface functions to allow an operator to manually manipulate each of the interfaces to the welding system 10, providing the operator control of the welding system 10 by way of the system control unit 20. Additionally, the operational computer program provides a facility for the operator to create, execute, load and delete additional computer programs to automate various welding tasks by commanding the sequenced operation of components of the welding system 10.

It will be understood that the above described embodiments and methods are illustrative in nature, and that modifications thereof may occur to those skilled in the art. Accordingly, this invention is not to be regarded as limited to the embodiments disclosed herein, but is to be limited only as defined in the appended claims.

We claim:

1. A welding head kit, comprising:
   a carriage;
   a torch assembly disposed on said carriage, the torch assembly including a mounting plate, and a torch block mounted on said mounting plate, the torch block defining a through-passage having first and second ends, and a welding gas passage in communication with said through-passage;
   a GTA filler wire adjustment module disposed on said torch assembly proximate to said welding torch;
   a GMA torch assembly adapted for mounting in the first end of said through-passage;
   a GTA torch assembly adapted for mounting in the first end of said through-passage;
   a GMA adapter sleeve adapted for mounting in the second end of said through-passage; and
   a cap adaptable for mounting in the second end of said through-passage.

2. The welding head kit according to claim 1, further comprising a filler wire supply conduit, the filler wire supply conduit having a first end and a second end, the second end having a coupling fitting adapted for engagement with either of said GTA filler wire guide and said GMA adapter sleeve.

3. The welding head kit according to claim 2, further comprising a wire supply providing a filler wire extending through said filler wire supply conduit.

4. The welding head kit according to claim 1, wherein said GMA torch assembly comprises:
   a GMA torch diffuser; and an adaptor having a first end for mounting in the first end of said through-passage, and a second end for receiving said GMA torch diffuser.

5. The welding head kit according to claim 1, wherein said GTA torch assembly comprises a gas lens having a first end for mounting in the first end of said through-passage.

6. The welding head kit according to claim 1, wherein the mounting plate defines an elongated slot and the torch block is movable along said slot.

7. The welding head kit according to claim 1, wherein the mounting plate defines an elongated slot and the GTA filler wire adjustment module is movable along said slot.

8. The welding head kit according to claim 1, wherein said GTA filler wire adjustment module comprises:
a base plate; and
a GTA filler wire guide adjustably coupled to said base plate.

9. A welding head, comprising:
a carriage;
a torch assembly disposed on said carriage, the torch assembly comprising a torch block defining a through-passage having first and second ends, a welding torch removably engaged in and extending from the first end, and a GMA adapter sleeve removably engaged in the second end, the torch block further defining a shielding gas passage in communication with said through-passage;
a GTA filler wire guide mounted on said torch assembly proximate to said torch block;
a filler wire feeder disposed on said carriage;
a filler wire conduit having first and second ends, the first end being in communication with said filler wire feeder for receiving a filler wire; and
a coupling fitting disposed on the second end of said filler wire conduit, the coupling fitting adapted for coupling said filler wire conduit to either of said GTA filler wire guide and said GMA adapter sleeve.

10. A method for configuring the welding head of claim 9 for GTA welding, comprising the steps of:
removing said GMA adapter sleeve from the second end of said through-passage;
inserting a cap in the second end of said through-passage;
coupling the second end of said filler wire supply conduit to said GTA filler wire guide; and
replacing said welding torch with a GTA torch.

11. The method of claim 10, further comprising the step of applying an electrical power source to said GTA torch for a GTA welding process.

12. The method of claim 10, further comprising the step of supplying a shielding gas for a GTA welding process to said shielding gas passage.

13. A welding system, comprising:
a carriage;
a torch assembly disposed on said carriage, the torch assembly comprising a torch block defining a through-passage having first and second ends, the torch block further defining a shielding gas passage in communication with said through-passage;
a welding torch removably engaged in and extending from the first end of said through-passage;
a GMA adapter sleeve removably engaged in the second end of said through passage;
a GTA filler wire guide mounted on said torch assembly proximate to said torch block;
a filler wire feeder disposed on said carriage;
a filler wire conduit having first and second ends, the first end in communication with said filler wire feeder for receiving a filler wire;
a coupling fitting disposed on the second end of said filler wire conduit, the coupling fitting adapted for coupling said filler wire conduit to either of said GTA filler wire guide and said GMA adapter sleeve;
a shielding gas control unit having a gas output in communication with said shielding gas passage and a plurality of gas inputs;
a computer processor in communication with said shielding gas control unit, the computer processor containing a computer program comprising instructions for selectively controlling said gas control unit to provide a GMA process shielding gas or a GTA process shielding gas to said shielding gas passage.

14. The welding system according to claim 13, further comprising a welding power supply control interface in communication with said computer processor, the computer program further comprising instructions for selectively controlling a welding power supply to provide welding power for a GMA process or for a GTA process.

* * * * *